Jan. 16, 1940.  O. VIERLING  2,186,942
PROCESS OF MAKING PHOTOGRAPHS
Filed Dec. 30, 1936
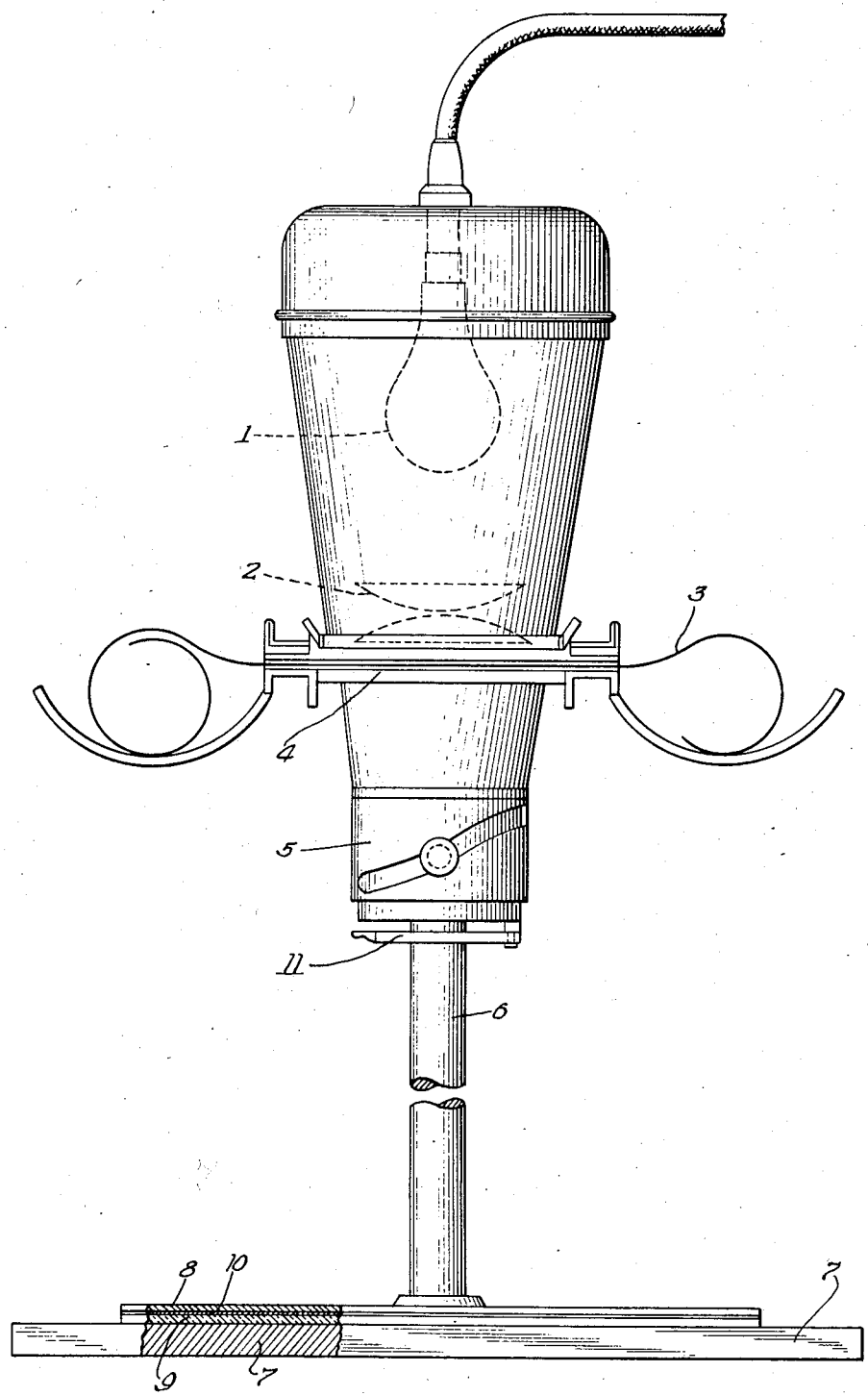
Inventor.
Otto Vierling
By Bilinger
Attorney Patented Jan. 16, 1940

2,186,942

UNITED STATES PATENT OFFICE 2,186,942

PROCESS OF MAKING PHOTOGRAPHS

Otto Vierling, Dresden, Germany, assignor to Zeiss Ikon Aktiengesellschaft, Dresden, Germany Application December 30, 1936, Serial No. 118,372
In Germany December 31, 1935

3 Claims. (Cl. 95—5)

The invention relates to improvements in a process of making photographs.

It is sometimes necessary to produce photographs upon a material, which when treated in a certain manner looses the original picture and becomes light sensitive again. Theoretically, the customary silver-halide emulsions would be suitable for this purpose, because it is known to convert the silver picture produced in the developer back into light sensitive silver-halide. This known process, however, is not suitable for practical or commercial exploitation, because there are involved chemical reactions which are complicated and cannot be repeated as often as desired.

It is an object of the present invention to substitute for the customary silver-halide such materials which when exposed to light take on a different color, and which loose this different color again either automatically or without chemical treatment, for instance by a suitable second exposure.

As an example of a material of this character may be mentioned triphenylfulgid, which is a substance having the formula $C_{24}H_{16}O_3$ and whose normal color of orange-red changes when exposed to blue or blue-green light rays into brown-black. This change of color is pretty steady. It can be reversed when subjected to an intense radiation, particularly with light having a long wave length.

In place of triphenylfulgid numerous other fulgides may be employed, for instance diphenyl-o-nitrophenylfulgid, whose normal red color will be darkened considerably when subjected to blue light rays, while for the reversion likewise light having a long wave length may be used.

Similar results are obtained when different substances of the group of hydrazones are employed.

It is another object of the invention to employ the substances mentioned above in the art of photography for the purpose set forth.

A particular object of the invention is the making of proof pictures from photographic negatives. It is an old requirement in the photographic art, that the negatives, which due to the inversion of the light values appear very unusual to the eye, be adapted to be converted temporarily for observation into positive pictures in a simple and inexpensive manner. This requirement has become more urgent ever since the miniature cameras have increased in popularity. These miniature cameras are loaded with film spools which permit a large number of exposures to be taken, for instance thirty-six, and the amateur has acquired the practice of taking a number of exposures from the same object and then uses only the best negative of the plurality taken for making positive prints, preferably in an enlarged scale. However, in order to select the best negative, it was until now necessary to make at least one contact print of each negative and then scrutinise the miniature positives very carefully, if necessary with a magnifying glass, to select the best picture, which then is used to make the customary enlargements. The present invention eliminates such a complicated and cumbersome procedure. According to the present invention the negatives are copied, preferably by simultaneous enlargement, upon a layer consisting of one of the above substances by means of light having a suitable wave length. The substances employed may be or may not be provided with a binder material, which may consist of gelatine, albumins, alginates, cellulose derivates, artificial resins or other substances used in the photographic art for similar purposes.

The single figure of the drawing illustrates diagrammatically and by way of example a projecting apparatus which may be employed for practicing the invention.

The projecting apparatus comprises a lamp 1, a condenser 2, a holder 4 for the negative film 3, and the lens system 5. These parts are combined to form a unit which is attached to the upper portion of a post 6 extending upwardly from a horizontal base plate 7 which forms also the support for the light sensitive layer 8 or screen upon which the picture is projected by the above described projecting apparatus. The light sensitive layer 8 is preferably attached to a carrier plate 9 by means of a binder 10. The carrier plate 9, depending upon the type of the projecting apparatus, may be transparent or opaque. The lamp 1 is either adapted to radiate light within a certain range of the spectrum, or the light rays are conducted through suitable color filters 11 or the like, which are arranged between the lamp 1 and the light sensitive layer 8.

The operation of the apparatus is the same as that of the conventional enlargement devices. The light sensitive layer 8, however, consists of one of the substances mentioned in the foregoing. If, for instance, the light sensitive layer 8 consists of triphenylfulgid, then the negative is projected with blue light upon the layer 8. Those portions of the layer 8 which are illuminated by the blue light will become dark, while those portions which are not hit by the blue light or are only slightly illuminated will not be darkened or only very little respectively; and consequently maintain their lighter color. Since now the portions of intense illumination correspond to the light portions in the negative, it follows that the light values of the projected picture are reversed with respect to the light values of the negative, or in other words, the projected picture is a positive. A correct amount of light which passes through the negative will produce a positive picture which is just as rich in contrast as a halogen-silver picture, and therefore it is well adapted to serve as a proof of the negative.

The light sensitive layer of the invention, however, possesses the great advantage over a halogen-silver emulsion, that the picture produced by the illumination disappears gradually again and that quite automatically. It is, however, more practical to make the picture disappear faster in a very short time by illuminating it with light having a long wave length. The light sensitive properties of the layer 8 are influenced during this extinguishing step to such a neglectible degree, that the layer 8 may be used countless times over and over again. If the material should loose its light-sensitiveness it may be regenerated by a chemical treatment.

The light sensitive layer of the invention may also be used for other purposes, for instance in the registration art. It is commonly considered a nuisance that the material onto which the registrations are recorded has to be exchanged or replaced after being used only once. In many cases it is not necessary to obtain a permanent record, and it is only desired that the record be temporarily exhibited for observation. The layer of the present invention is now sufficiently sensitive to light, that it may be employed in standard registration devices, provided that the lamp is substituted by another one which emits light within the correct range of the spectrum.

The light sensitive layer of the invention may also be employed in the art of picture telegraphy and for television purposes.

It is also possible to apply the light sensitive layer without a binder to a carrier which preferably is provided with an adhesive surface. Such a carrier may consist of a cellulose ester layer the surface of which has been dissolved. The carrier may also consist of a glass plate provided with an adhesive layer of sodium silicate or gelatine.

Furthermore, the invention is not limited to the making of photographs having reverse light values with respect to the picture which for the purpose of being copied is illuminated. It is also possible to darken first the entire layer uniformly by diffused light, whereupon upon the darkened layer a picture is copied by employing light having a different wave length. The picture then produced on the layer has the same light values as the one appearing on the picture which is being copied.

Therefore, it is obvious that the light sensitive layer of the invention may be employed for making pictures which are a direct copy or which are a reversed copy of the original picture.

It is also within the scope of the present invention to produce colored pictures, by employing for instance, in accordance with the principles of three-color photography, three different light sensitive substances, which when illuminated by light having a long wave length are colored blue-green, yellow and purple red respectively, and are colored darker by light of different wave length. The original to be copied and being correspondingly colored or being illuminated by light of corresponding color, is then copied upon the light sensitive layer by projecting upon the latter the partial color pictures either simultaneously or one after the other, whereby the colors will appear at the light spots, while the dark spots will be blackened. In this manner a colored picture is produced of approximately the correct color combination as it is sufficient for many purposes.

What I claim is:

1. A process of making photographic positives, including the steps of illuminating a layer of fulgides through a negative with colored light of a predetermined wave length, said layer being adapted to change its color under the influence of and in accordance with the intensity of illumination by said light passing through the negative, and then subjecting the layer of fulgides to light of another predetermined different wave length, said layer of fulgides being adapted to change back to the original color under the influence of said second illumination, whereby the picture produced on said layer by the first illumination is caused to disappear.

2. In a process of making photographic positives, the steps of illuminating a layer of triphenyl fulgide through a negative with colored light of a predetermined wave length, said layer being adapted to change its color under the influence of and in accordance with the intensity of illumination by said light passing through the negative, whereby a picture of positive character becomes visible in the triphenyl fulgide layer, and then subjecting the same layer to light of another predetermined wave length, the layer of triphenyl fulgide being adapted to change back to the original color under the influence of the second illumination, whereby said previously produced picture of positive character is caused to disappear.

3. A process of making photographic positives, including the steps of illuminating a layer of fulgide through a negative with blue light, said layer being adapted to change its color under the influence of and in accordance with the intensity of illumination by the blue light passing through the negative so as to produce a picture of positive character in the layer of fulgides, and then subjecting the layer of fulgides subsequent to removal of the negative to illumination by red light, whereby said layer of fulgides is changed back to the original color and the picture of positive character is caused to disappear.

OTTO VIERLING.